United States Patent [19]

Sugiyama

[11] Patent Number: 5,616,905
[45] Date of Patent: Apr. 1, 1997

[54] TWO-DIMENSIONAL CODE RECOGNITION METHOD

[75] Inventor: Makoto Sugiyama, Mishima, Japan

[73] Assignee: Kabushiki Kaisha TEC, Shizuoka, Japan

[21] Appl. No.: 389,591

[22] Filed: Feb. 16, 1995

[30] Foreign Application Priority Data

Feb. 24, 1994 [JP] Japan .................................. 6-026902

[51] Int. Cl.⁶ .................................................. G06K 7/10
[52] U.S. Cl. ...................................... 235/456; 235/470
[58] Field of Search ............................... 235/456, 470, 235/471

[56] References Cited

U.S. PATENT DOCUMENTS

| | | | |
|---|---|---|---|
| 4,924,078 | 5/1990 | Sant'Anselmo et al. | 235/494 |
| 4,939,354 | 7/1990 | Priddy et al. | 235/456 |
| 5,128,528 | 7/1992 | Heninger | 235/470 |
| 5,204,515 | 4/1993 | Yoshida | 235/470 X |
| 5,220,621 | 6/1993 | Saitoh | 382/22 |
| 5,311,600 | 5/1994 | Aghajan | 382/14 |
| 5,365,600 | 11/1994 | Nagaishi | 382/41 |
| 5,396,054 | 3/1995 | Krichever et al. | 235/470 X |
| 5,430,810 | 7/1995 | Saeki | 382/281 |
| 5,454,054 | 9/1995 | Iizuka | 235/456 X |

FOREIGN PATENT DOCUMENTS

| | | | |
|---|---|---|---|
| 0564708A2 | 10/1993 | European Pat. Off. | G06K 7/14 |
| 3735935A1 | 5/1989 | Germany | G06F 15/66 |
| 60-55483 | 3/1985 | Japan . | |
| 61-131183 | 6/1986 | Japan . | |
| 62-3475 | 1/1987 | Japan . | |
| 1-35385 | 7/1989 | Japan . | |

OTHER PUBLICATIONS

IBM Technical Disclosure Bulletin, vol. 34, No. 4B, Sep., 1991, New York, US, pp. 72–75.

Primary Examiner—Donald T. Hajec
Assistant Examiner—Steven Wigmore
Attorney, Agent, or Firm—Frishauf, Holtz, Goodman, Langer & Chick

[57] ABSTRACT

According to a two-dimensional code recognition method of the present invention, first, a two-dimensional image is input in step S1, and an edge is detected in step S2. This edge detection is performed by scanning pixels on a scanning line every several dots. A straight line is extracted in accordance with the Hough transform and the least square approximation in step S3, and a combination of straight lines is selected in step S4. Then, the size of a figure is detected in step S5. In step S6, two remaining straight lines are extracted, and the figure is extracted. In step S7, matrix information is extracted from the extracted figure, and codes are recognized. The flow returns to the selection of a combination of straight lines in step S4 until the straight line detection and the figure recognition can be accurately performed in steps S5, S6, and S7.

28 Claims, 6 Drawing Sheets

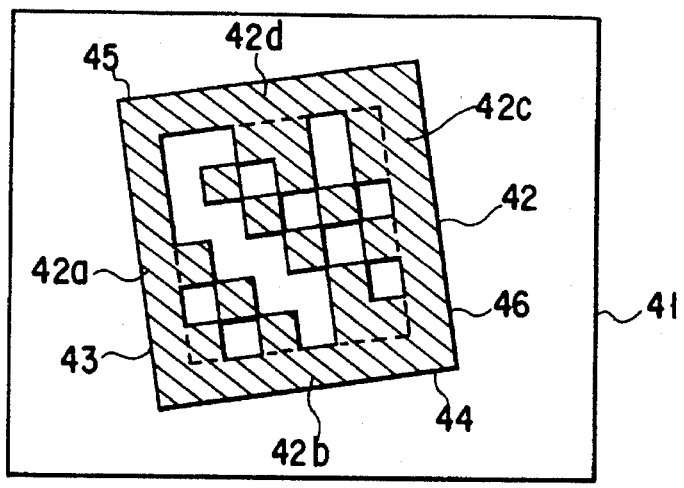
F I G. 14
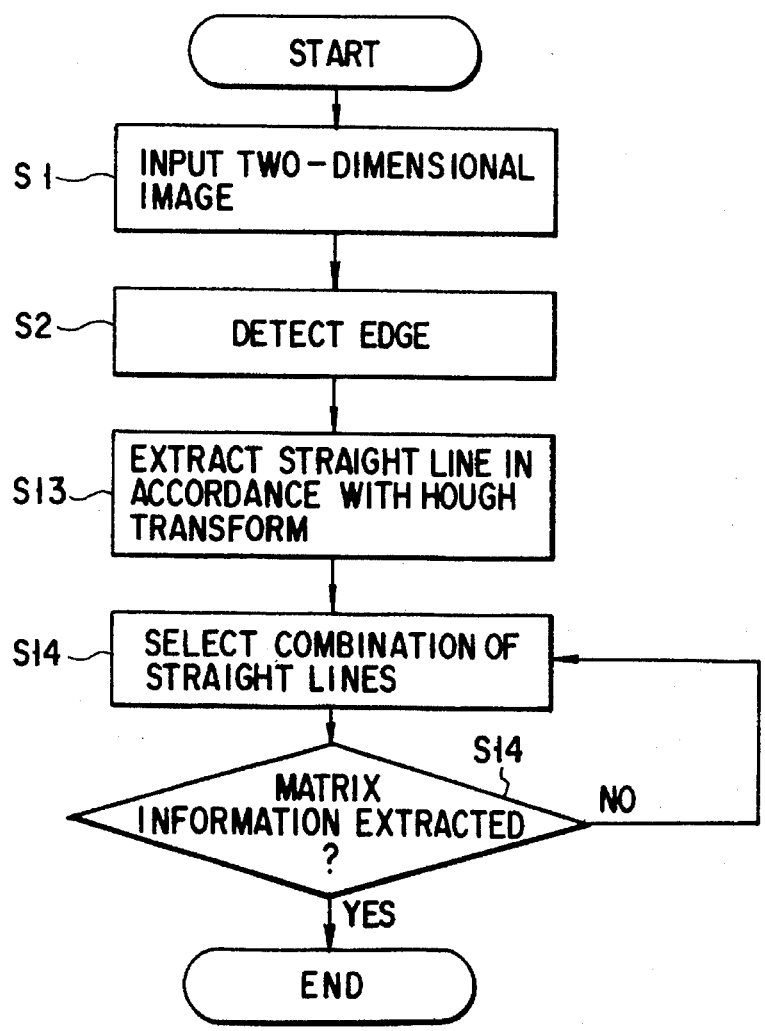
F I G. 15

TWO-DIMENSIONAL CODE RECOGNITION METHOD

BACKGROUND OF THE INVENTION

1. Field of the Invention

The present invention relates to a two-dimensional code recognition apparatus, for example, such as a two-dimensional code reading apparatus, and a two-dimensional code recognition method.

2. Description of the Related Art

An image recognition apparatus of this type reads an image including a rectangular two-dimensional code figure having data arranged in a matrix form whose at least two or four sides are straight lines or a figure similar to the two-dimensional code figure, and extracts to recognize the two-dimensional code figure or the figure similar to the two-dimensional code figure from the read image. Note that a figure similar to a two-dimensional code figure is an image obtained by, e.g., reading an IC element mounted on a printed board as a two-dimensional figure, and the like.

Such an image recognition apparatus detects the position of a target two-dimensional figure 2 to be extracted from a read two-dimensional image 1, as shown in FIG. 16A. The pattern matching method as disclosed in, e.g., Jpn. Pat. Applin. KOKOKU Publication No. 62-3475 is frequently employed for this position detection.

This pattern matching method uses a plurality of reference patterns 3 as shown in FIG. 16B. The two-dimensional image 1 is scanned using the reference patterns 3, the similarities of the reference patterns 3 are represented by numerical values, and a portion having the obtained numerical value close to the numerical value of the two-dimensional image 1 is extracted, thereby detecting the position of the target two-dimensional figure 2 to be extracted.

The outline edge tracing method as disclosed in, e.g., Jpn. Pat. Applin. KOKOKU Publication No. 1-35385 is also used well for this position detection.

This outline edge tracing method is a method of detecting features of the outline of a figure. As shown in FIG. 17, an edge between a black pixel portion 4 and a white pixel portion 5 is traced as indicated by a solid arrow 6 to detect the outline of the figure.

The pattern matching method described above is known as a very effective method as a method of extracting the target two-dimensional figure 2 from the two-dimensional image 1 having a certain feature. This method is also effective to extract a figure having a feature like a rectangular two-dimensional code figure having data arranged in a matrix form whose at least two sides are straight lines or four sides are straight lines. However, in reading an image, it is rare that the two-dimensional code figure is present always parallel to the two-dimensional image, as shown in FIG. 16A. In many cases, as shown in FIG. 18A, the two-dimensional code figure 2 is read to be inclined with respect to the two-dimensional image 1.

For this reason, to extract the two-dimensional code figure 2 by using the pattern matching method in practice, reference patterns 7 representing straight lines having various inclination angles are prepared, as shown in FIG. 18B. The two-dimensional image 1 is sequentially scanned to detect the position of the target two-dimensional figure 2, thus requiring a long period of time for extracting the figure.

The above outline edge tracing method, unlike the pattern matching method, has no problem in detecting the position of an inclined straight line. In addition, only a portion having a feature in a two-dimensional image is retrieved, thus requiring a relatively short period of time for extracting a figure. However, it is difficult to specify the start point for tracing an outline edge. Even if the start point can be obtained smoothly, when a figure having a defect 8, as shown in FIG. 19, is read, the defect 8 portion is traced as an outline, as indicated by an dotted arrow 9 in FIG. 19. An outline different from the original outline is undesirably recognized.

SUMMARY OF THE INVENTION

It is an object of the present invention to provide an image recognition apparatus which can accurately extract a rectangular two-dimensional code figure having data arranged in a matrix form whose at least two or four sides are straight lines or a figure similar to the two-dimensional code figure at high speed by using the Hough transform and the least square approximation for straight line position detection and rapidly performing edge detection, extract matrix information, and perform code recognition.

It is another object of the present invention to provide an image recognition apparatus which can accurately extract a rectangular two-dimensional code figure having data arranged in a matrix form whose at least two sides are straight lines or a figure similar to the two-dimensional code figure at high speed by using the Hough transform and the least square approximation for straight line position detection and rapidly storing image information in an image memory, and extract matrix information.

It is still another object of the present invention to provide an image recognition apparatus which can accurately extract a rectangular two-dimensional code figure having data arranged in a matrix form whose at east two sides are straight lines or a figure similar to the two-dimensional code figure at high speed by using the Hough transform and the least square approximation for straight line position detection and accurately detecting the position of a straight line, and extract matrix information.

It is still another object of the present invention to provide an image recognition apparatus which can accurately extract a rectangular two-dimensional code figure having data arranged in a matrix form whose at least two sides are straight lines or a figure similar to the two-dimensional code figure at high speed by using the Hough transform and the least square approximation for straight line position detection and accurately detecting the size of a matrix element, and accurately extract matrix information.

According to the present invention, a two-dimensional code recognition apparatus which reads an image including a rectangular two-dimensional code figure having data arranged in a matrix form whose at least two sides are straight lines or a figure similar to the two-dimensional code figure, and extracts, from a read two-dimensional image information, the two-dimensional code figure and the figure similar to the two-dimensional code figure, and codes comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, first straight line position detecting means for detecting positions of two straight lines crossing each other from the image information stored in the image memory in accordance with a Hough transform and a least square approximation, length detecting means for detecting lengths of the two straight lines detected by the first straight line position detecting means, second straight line position detecting means for detecting positions of two remaining straight lines crossing each other on the basis of the positions and lengths of the two straight lines detected by the first straight line detecting means and the length detecting means, matrix element detecting means for extracting a target figure to be recognized in accordance with the positions of the straight lines detected by the first and second straight line position detecting means and the lengths of the straight lines detected by the length detecting means and detecting a size of a matrix element constituting a matrix in accordance with the extracted figure, and information extracting means for extracting matrix information on the basis of a size of the extracted target figure to be recognized and the size of the matrix element, wherein the edge detecting means detects pixels on a scanning line every several dots to perform edge detection.

In the two-dimensional code recognition apparatus of the present invention having the above arrangement, image information stored in the image memory is scanned in the lateral and vertical directions by the edge detecting means to detect the edge of a figure. At this time, pixels on a scanning line are detected every several dots to perform edge detection. With this operation, the edge detection is performed at high speed.

The positions of two crossing straight lines are detected from the image information stored in the image memory by using the Hough transform and the least square approximation, and then the lengths of the two detected straight lines are detected. The positions of two remaining crossing straight lines are detected on the basis of the positions and lengths of the two detected straight lines.

The target figure to be recognized is extracted in accordance with the positions and lengths of the straight lines detected in the above manner, and the size of each matrix element constituting a matrix is detected. Matrix information is extracted on the basis of the size of the extracted target figure to be recognized and the size of the matrix element.

According to the present invention, a two-dimensional code recognition apparatus which reads an image including a rectangular two-dimensional code figure having data arranged in a matrix form whose four sides are straight lines or a figure similar to the two-dimensional code figure, and extracts, from a read two-dimensional image information, the two-dimensional code figure and the figure similar to the two-dimensional code figure, and the apparatus comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, straight line position detecting means for detecting positions of four straight lines crossing each other from the image information stored in the image memory in accordance with a Hough transform and a least square approximation, length detecting means for detecting lengths of the four straight lines detected by the straight line position detecting means, matrix element detecting means for extracting a target figure to be recognized in accordance with the positions of the straight lines detected by the straight line position detecting means and the lengths of the straight lines detected by the length detecting means and detecting a size of a matrix element constituting a matrix in accordance with the extracted figure, and information extracting means for extracting matrix information on the basis of a size of the extracted target figure to be recognized and the size of the matrix element, wherein the edge detecting means performs edge detection by detecting pixels on a scanning line every several dots.

In the two-dimensional code recognition apparatus of the present invention having the above arrangement, image information stored in the image memory is scanned in the lateral and vertical directions by the edge detecting means to detect the edge of a figure. At this time, pixels on a scanning line are detected every several dots to perform edge detection. With this operation, the edge detection is performed at high speed.

The positions of four crossing straight lines are detected from the image information stored in the image memory in accordance with the Hough transform and the least square approximation, and then the lengths of the four detected straight lines are detected.

The target figure to be recognized is extracted in accordance with the positions and lengths of the straight lines detected in the above manner, and the size of each matrix element which constitutes a matrix is detected. Matrix information is extracted on the basis of the size of the extracted target figure to be recognized and the size of the matrix element.

According to the present invention, a two-dimensional code recognition apparatus which reads an image including a rectangular two-dimensional code figure having data arranged in a matrix form whose at least two sides are straight lines or a figure similar to the two-dimensional code figure, and extracts, from a read two-dimensional image information, the two-dimensional code figure and the figure similar to the two-dimensional code figure, and the apparatus comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, first straight line position detecting means for detecting positions of two straight lines crossing each other from the image information stored in the image memory in accordance with a Hough transform and a least square approximation, length detecting means for detecting lengths of the two straight lines detected by the first straight line position detecting means, second straight line position detecting means for detecting positions of two remaining straight lines which cross each other on the basis of the positions and lengths of the two straight lines detected by the first straight line detecting means and the length detecting means, matrix element detecting means for extracting a target figure to be recognized in accordance with the positions of the straight lines detected by the first and second straight line position detecting means and the lengths of the straight lines detected by the length detecting means and detecting a size of a matrix element which constitutes a matrix in accordance with the extracted figure, and information extracting means for extracting matrix information on the basis of a size of the extracted target figure to be recognized and the size of the matrix element, wherein, when the read image information is divided into odd and even fields, the means of storing the image information in the image memory reads one of the odd and even fields, interpolates the fields, and stores data in the image memory.

In the two-dimensional code recognition apparatus of the present invention having the above arrangement, image information obtained by reading an image is stored in the image memory. When the read image information is divided into odd and even fields, one of the odd and even fields is read, the read fields are interpolated, and the resultant data is stored in the image memory. With this operation, the image information is stored in the image memory at high speed.

The image information stored in the image memory is scanned in the lateral and vertical directions by the edge detecting means to detect the edge of a figure. The positions of two crossing straight lines are detected from the image information stored in the image memory in accordance with the Hough transform and the least square approximation, and then the lengths of the two detected straight lines are detected. The positions of two remaining crossing straight lines are detected on the basis of the positions and lengths of the two detected straight lines.

The target figure to be recognized is extracted in accordance with the positions and lengths of the straight lines detected in the above manner, and the size of each matrix element which constitutes a matrix is detected in accordance with the extracted figure. Matrix information is extracted on the basis of the size of the extracted target figure to be recognized and the size of the matrix element.

According to the present invention, a two-dimensional code recognition apparatus which reads an image including a rectangular two-dimensional code figure having data arranged in a matrix form whose at least two sides are straight lines or a figure similar to the two-dimensional code figure, and extracts, from a read two-dimensional image information, the two-dimensional code figure and the figure similar to the two-dimensional code figure, and the apparatus codes comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, first straight line position detecting means for detecting positions of two straight lines crossing each other from the image information stored in the image memory in accordance with a Hough transform and a least square approximation, length detecting means of detecting lengths of the two straight lines detected by the first straight line position detecting means, second straight line position detecting means for detecting positions of two remaining straight lines which cross each other on the basis of the positions and lengths of the two straight lines detected by the first straight line detecting means and the length detecting means, matrix element detecting means for extracting a target figure to be recognized in accordance with the positions of the straight lines detected by the first and second straight line position detecting means and the lengths of the straight lines detected by the length detecting means and detecting a size of a matrix element which constitutes a matrix in accordance with the extracted figure, and information extracting means for extracting matrix information on the basis of a size of the extracted target figure to be recognized and the size of the matrix element, wherein the edge detecting means performs edge detection first in one direction in which scanning can be performed by accessing continuous addresses, specifies the position of presence of the target figure to be recognized, and then performs edge detection on the specified position of presence of the figure in the other direction.

In the two-dimensional code recognition apparatus of the present invention having the above arrangement, image information stored in the image memory is scanned in the lateral and vertical directions by the edge detecting means to detect the edge of a figure. At this time, the edge detection is performed first in one direction in which scanning can be performed by accessing continuous addresses, and the present position of the target figure to be recognized is specified. Then, edge detection is performed on the specified present position of the figure in the other direction. With this operation, the edge detection is performed at high speed.

The positions of two crossing straight lines are detected from the image information stored in the image memory in accordance with the Hough transform and the least square approximation, and then the lengths of the two detected straight lines are detected. The positions of two remaining crossing straight lines are detected on the basis of the positions and lengths of the two detected straight lines.

The target figure to be recognized is extracted in accordance with the positions and lengths of the straight lines detected in the above manner, and the size of each matrix element which constitutes a matrix is detected in accordance with the extracted figure. Matrix information is extracted on the basis of the size of the extracted target figure to be recognized and the size of the matrix element.

According to the present invention, a two-dimensional code recognition apparatus which reads an image including a rectangular two-dimensional code figure having data arranged in a matrix form whose at least two sides are straight lines or a figure similar to the two-dimensional code figure, and extracts, from a read two-dimensional image information, the rectangular two-dimensional code figure and the figure similar to the two-dimensional code figure, and the apparatus comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, first straight line position detecting means for detecting positions of two straight lines crossing each other from the image information stored in the image memory in accordance with a Hough transform and a least square approximation, length detecting means for detecting lengths of the two straight lines detected by the first straight line position detecting means, second straight line position detecting means for detecting positions of two remaining straight lines which cross each other on the basis of the positions and lengths of the two straight lines detected by the first straight line detecting means and the length detecting means, matrix element detecting means for extracting a target figure to be recognized in accordance with the positions of the straight lines detected by the first and second straight line position detecting means and the lengths of the straight lines detected by the length detecting means and detecting a size of a matrix element which constitutes a matrix in accordance with the extracted figure, and information extracting means for extracting matrix information on the basis of a size of the extracted target figure to be recognized and the size of the matrix element, wherein, when a distance between the origin and a straight line passing through an arbitrary sampling point and having an angle $\theta$ is defined as R, the first straight line position detecting means compares the distances R of straight line candidates having the same angle $\theta$ or angles close to each other, and eliminates straight lines from the straight line candidates if the straight lines are determined to be identical.

In the two-dimensional code recognition apparatus of the present invention having the above arrangement, image information stored in the image memory is scanned in the lateral and vertical directions by the edge detecting means to detect the edge of a figure. The positions of two crossing straight lines are detected from the image information stored in the image memory in accordance with the Hough transform and the least square approximation. At this time, assume that a distance between the origin and a straight line passing through an arbitrary sampling point and having an angle θ is defined as R. The distances R of straight line candidates having the same angle θ or angles close to each other are compared. When these straight lines are determined to be identical, they are eliminated from the straight line candidates. With this operation, a straight line is accurately detected.

Then, the lengths of the two detected straight lines are detected. The positions of two remaining crossing straight lines are detected on the basis of the positions and lengths of the two detected straight lines.

The target figure to be recognized is extracted in accordance with the positions and lengths of the straight lines detected in the above manner, and the size of each matrix element which constitutes a matrix is detected in accordance with the extracted matrix. Matrix information is extracted on the basis of the size of the extracted target figure to be recognized and the size of the matrix element.

According to the present invention, a two-dimensional recognition apparatus which reads an image including a rectangular two-dimensional code figure having data arranged in a matrix form whose at least two sides are straight lines or a figure similar to the two-dimensional code figure, and extracts, from a read two-dimensional image information, the two-dimensional code figure and a figure similar to the two-dimensional code figure, and the apparatus codes comprises means for storing, in an image memory, image information obtained by reading a two-dimensional code figure or a figure similar to the two-dimensional code figure, edge detecting means for detecting an edge of the figure by scanning the image information stored in the image memory in vertical and lateral directions, first straight line position detecting means for detecting positions of two straight lines crossing each other from the image information stored in the image memory in accordance with a Hough transform and a least square approximation, length detecting means for detecting lengths of the two straight lines detected by the first straight line position detecting means, second straight line position detecting means for detecting positions of two remaining straight lines which cross each other on the basis of the positions and lengths of the two straight lines detected by the first straight line detecting means and the length detecting means, matrix element detecting means for extracting the target figure to be recognized in accordance with the positions of the straight lines detected by the first and second straight line position detecting means and the lengths of the straight lines detected by the length detecting means and detecting a size of a matrix element which constitutes a matrix in accordance with the extracted figure, and information extracting means for extracting matrix information on the basis of a size of the extracted target figure to be recognized and the size of the matrix element, wherein the matrix element detecting means individually detects sizes of a white matrix element and a black matrix element, and employs an intermediate value between the individually detected sizes of the matrix elements as the size of the matrix element.

In the two-dimensional code recognition apparatus of the present invention having the above arrangement, image information stored in the image memory is scanned in the lateral and vertical directions by the edge detecting means to detect the edge of a figure. The positions of two crossing straight lines are detected from the image information stored in the image memory in accordance with the Hough transform and the least square approximation, and then the lengths of the two detected straight lines are detected. The positions of two remaining crossing straight lines are detected on the basis of the positions and lengths of the two detected straight lines.

The target figure to be recognized is extracted in accordance with the positions and lengths of the straight lines detected in the above manner, and the size of each matrix element which constitutes a matrix is detected in accordance with the extracted figure. At this time, the size of the white matrix element and the size of the black matrix element are individually detected. An intermediate value between the individually detected values is defined as the size of matrix element. With this operation, the size of the matrix element can be accurately detected. Then, matrix information is extracted on the basis of the size of the extracted target figure to be recognized and the size of the matrix element.

As described above, according to the present invention, the two-dimensional code recognition apparatus which can accurately extract a rectangular two-dimensional code figure having data arranged in a matrix form whose at least two or four sides are straight lines or a figure similar to the two-dimensional code figure at high speed by using the Hough transform and the least square approximation for straight line position detection, extract matrix information, and perform code recognition can be provided.

According to the present invention, the two-dimensional code apparatus which can accurately extract a rectangular two-dimensional code figure having data arranged in a matrix form whose at least two sides are straight lines or a figure similar to the two-dimensional code figure at high speed by using the Hough transform and the least square approximation for straight line position detection and rapidly storing image information in an image memory, and extract matrix information can be provided.

According to the present invention, the two-dimensional code apparatus which can accurately extract a rectangular two-dimensional code figure having data arranged in a matrix form whose at least two sides are straight lines or a figure similar to the two-dimensional code figure at high speed by using the Hough transform and the least square approximation for straight line position detection and accurately detecting the position of a straight line, and extract matrix information can be provided.

According to the present invention, the two-dimensional code recognition apparatus which can accurately extract a rectangular two-dimensional code figure having data arranged in a matrix form whose at least two sides are straight lines or a figure similar to the two-dimensional code figure at high speed by using the Hough transform and the least square approximation for straight line position detection and accurately detecting the size of a matrix element, and accurately extract matrix information can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a view showing a two-dimensional image area and a two-dimensional code figure according to the second embodiment of the present invention;

FIG. 15 is a flow chart showing figure extraction processing according to the second embodiment;

DETAILED DESCRIPTION OF THE PREFERRED EMBODIMENTS

Figure 1:
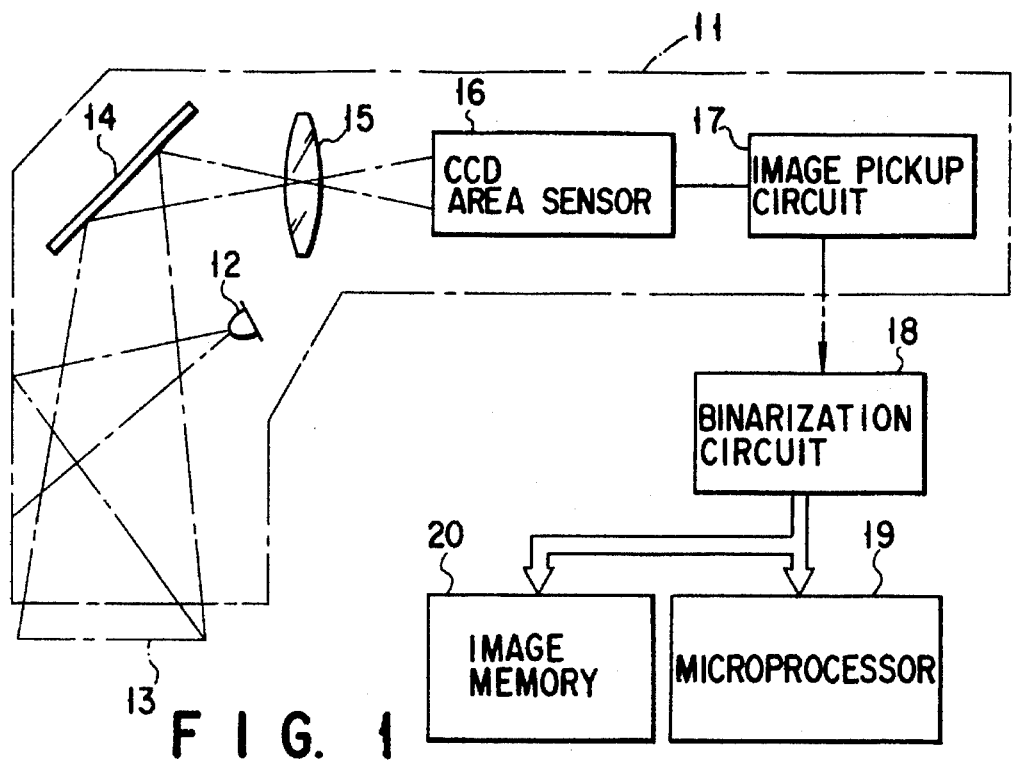
FIG. 1 is a block diagram showing the arrangement of the first embodiment of the present invention.

Embodiments of the present invention will be described hereinafter with reference to the accompanying drawings.
First Embodiment FIG. 1 is a block diagram showing the arrangement of an image recognition apparatus. Reference numeral 11 denotes a hand scanner.

The hand scanner 11 comprises a light source 12 constituted by, e.g., a plurality of light-emitting diodes. After a light beam from the light source 12 is reflected inside the hand scanner 11, the reflected light beam is emitted, through a read window, on a code holder 13 on which a rectangular two-dimensional code figure having data arranged in a matrix form whose two sides are straight lines is printed.

In the hand scanner 11, after the light beam reflected by the code holder 13 is reflected by a return mirror 14, the reflected light beam is focused by a condenser lens 15 to be irradiated on the light-receiving surface of a CCD area sensor 16.

The CCD area sensor 16 reads the two-dimensional code figure printed on the code holder 13 in accordance with the intensity of light components in the received reflected light beam, and converts the light components into an electric signal.

The electric signal from the CCD area sensor 16 is converted into a video signal by an image pickup circuit 17 in the hand scanner 11, and the video signal is output outside.

Outside the hand scanner 11, a binarization circuit 18, a microprocessor 19, and an image memory 20 are arranged. The binarization circuit 18 digitizes the video signal from the image pickup circuit 17, and the binarized signal is stored in the image memory 20 as image information by the microprocessor 19.

The microprocessor 19 processes the image information stored in the image memory 20 on the basis of a program, and performs edge detection of the figure, extraction of the two-dimensional code figure, recognition of matrix information, and the like.

Figure 2:
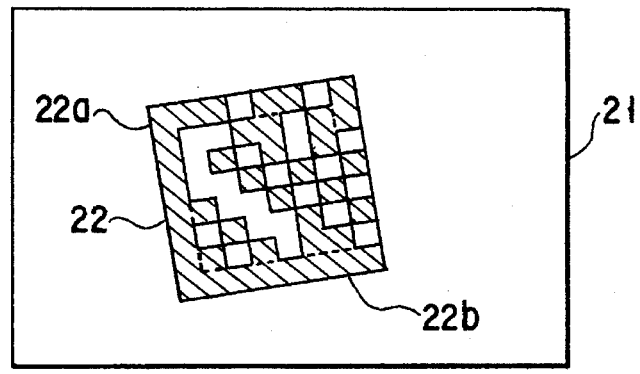
FIG. 2 is a view showing a two-dimensional image area and a two-dimensional code figure according to the first embodiment.

FIG. 2 is a view showing a two-dimensional image area 21 obtained by reading a rectangular two-dimensional code figure and a two-dimensional code figure 22 as an extraction target in the two-dimensional image area 21.

When the image information from the binarization circuit 18 is divided into odd and even fields to be input, the microprocessor 19 fetches one of the odd and even fields, interpolates these fields, and stores the resultant data in the image memory 20. For example, when the odd field is fetched, this single odd field is fetched twice to interpolate even-field data.

With the above operation, the shutter speed of the CCD area sensor 16 can be set higher than the normal speed. The resistance to blur can be improved, and processing for storing image information in the image memory 20 can be performed at high speed.

The two-dimensional code figure 22 is set as a rectangular two-dimensional code figure having data arranged in a matrix form whose two sides 22a and 22b are straight lines. That is, an actual data range is indicated by a chain line in FIG. 2.

Figure 3:
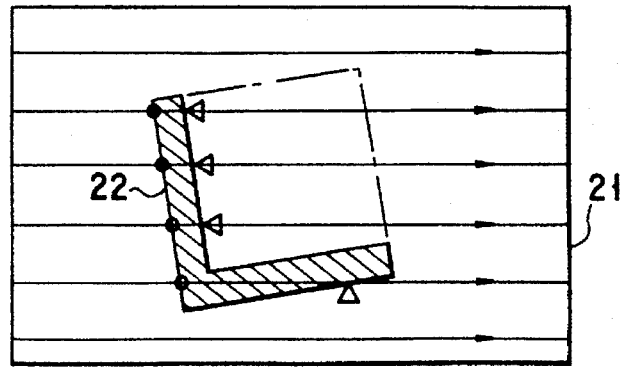
FIG. 3 is a view for explaining edge point extraction by lateral scanning according to the first embodiment.

As shown in FIG. 3, the two sides 22a and 22b serving as straight lines of the two-dimensional code figure 22 are scanned in the lateral direction at a predetermined interval, and edge points indicated by o and Δ in FIG. 3 are extracted. Further, as shown in FIG. 4, the two sides 22a and 22b are scanned in the vertical direction at a predetermined interval, and edge points indicated by o and Δ in FIG. 4 are extracted.

Note that scanning in the lateral and vertical directions is not performed on all the pixels in the entire image, but performed at a predetermined interval for the purpose of shortening the processing time.

Figure 4:
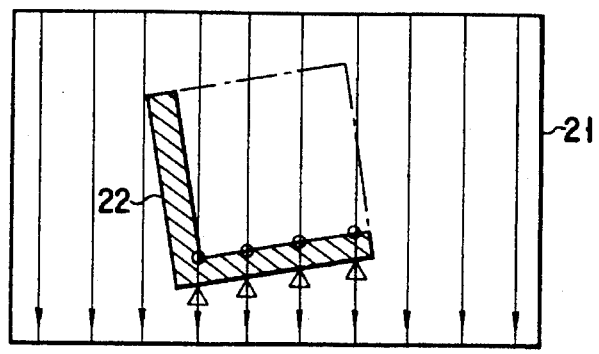
FIG. 4 is a view for explaining edge point extraction by vertical scanning according to the first embodiment.

It is determined by this scanning whether each edge point has an attribute as a leading edge (i.e., an edge point indicated by o in FIG. 3 or 4) and a trailing edge (i.e., an edge point indicated by Δ in FIG. 3 or 4).

At this time, edge detection is performed to use the edge points as sampling points for the Hough transform (to be described later). The Hough transform undesirably requires a long processing time for a large number of sampling points. Therefore, to increase the processing speed, it is very important to minimize the number of sampling points.

In a rectangular two-dimensional code figure arranged in a matrix form, each of the two sides 22a and 22b is always input with a certain thickness corresponding to several dots. By using this nature, a black pixel group having a thickness smaller than the certain thickness is not regarded as an edge point. More specifically, in each scanning line, all the pixels need not be checked, and the resultant change points need not be defined as edges. For example, if the thickness of the black pixel group of a figure is defined by five dots, the scanning lines can be scanned every four dots to perform edge detection.

Figure 5:
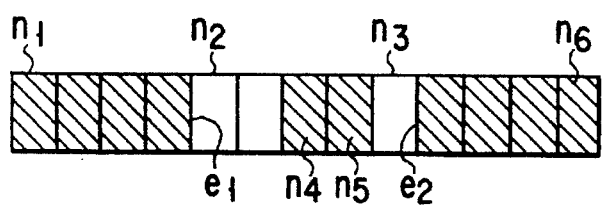
FIG. 5 is a view for explaining edge detection according to the first embodiment.

For example, assume that part of a given scanning line is constituted by black and white pixels arranged, as shown in FIG. 5. If the start scanning point is defined as a point $n_1$, the next point is a point $n_2$ which advances from the point $n_1$ by four dots. The point $n_1$ is a black pixel, and the point $n_2$ is a white pixel. It is found that an edge point is present between the four dots. A change point is checked from the point $n_2$ to the point $n_1$ dot by dot, thereby detecting an edge $e_1$.

A point $n_3$ which advances from the point $n_2$ by four dots is a white pixel as in the point $n_2$. For this reason, it is determined that any edge point is not present between these four dots. That is, black pixels represented by points $n_4$ and $n_5$ are skipped. No read error occurs because the line thickness is defined by five dots.

A point $n_6$ which advances from the point $n_3$ by four dots is a black pixel, and it is found that an edge point is present between these four dots. A change point is checked from the point $n_6$ to the point $n_3$ dot by dot, thereby detecting an edge $e_2$.

when edge point detection is performed as described above, access to the image memory 20 can be reduced, and the edge detection time can be greatly shortened. A pixel group having a line thickness smaller than the defined thickness, which is formed by a defect or the like, is discarded. An adverse influence on read performance which is caused by a defect or the like can be reduced. In addition, since the number of sampling points for the Hough transform can be reduced, the Hough transform speed can be increased, and the processing time can be shortened.

To detect an edge, the two-dimensional image area 21 is developed in the image memory 20. If addresses are continuous in the lateral direction in scanning this image, scanning can be performed while the addresses of the image memory are continuous in the lateral direction. However, scanning cannot be performed while the addresses of the image memory are continuous in the vertical direction.

Lateral scanning can be performed at high speed, while vertical scanning takes a longer period of time than that in lateral scanning.

Judging from the above circumstances, when an access method for the image memory 20 employs a 16-bit width in the image storage form of one bit/pixel, the following algorithm is used to increase the edge detection speed.

Most of image information of the two-dimensional image area 21 is a continuation of white or black pixels. By using this nature, pixels at a given address value of 0H or FFFFH are regarded as 16 white or black pixels. With this operation, a figure can be recognized by one memory access operation although memory access is supposed to be performed 16 times. When a white or black pixel is to be determined every four dots, as described above, the pixel is recognized by one memory access operation although this recognition is supposed to require memory access four times.

This algorithm, however, can be used only for scanning in the lateral direction in which the addresses are continuous.

For this reason, in this embodiment, edge detection is performed first by lateral scanning at high speed. Positions of presence of codes are specified during this edge detection, and then edge detection in the vertical direction is performed only with respect to the specified positions of presence of the codes. With this operation, a time required for edge detection in the vertical direction is shortened, thereby rapidly performing edge detection as a whole.

When an edge point is detected, a straight line is then extracted in accordance with the Hough transform. The Hough transform method is known as a straight line extraction algorithm in an image. More specifically, in the Hough transform, a distance between the origin and a straight line having an angle θ and passing through an arbitrary sampling point on an image is defined as R, distances R corresponding to all the angles θ are calculated with respect to all the sampling points, and a straight line representing a frequently appearing combination of all the combinations of the angles θ and the distances R is defined as an extracted straight line.

To perform the Hough transform in a computer, a two-dimensional array using θ and R as parameters is secured, and data are entered in the array elements of the array from each sampling point. At this time, when the angle θ is set to have a small interval, the number of arithmetic operations increases, and the processing speed is undesirably reduced. In addition, when the distance R is strictly defined, a very large two-dimensional array is required. In this embodiment, θ and R are coarsely defined, and a step of strictly extracting a straight line is subsequently set.

Figure 6:
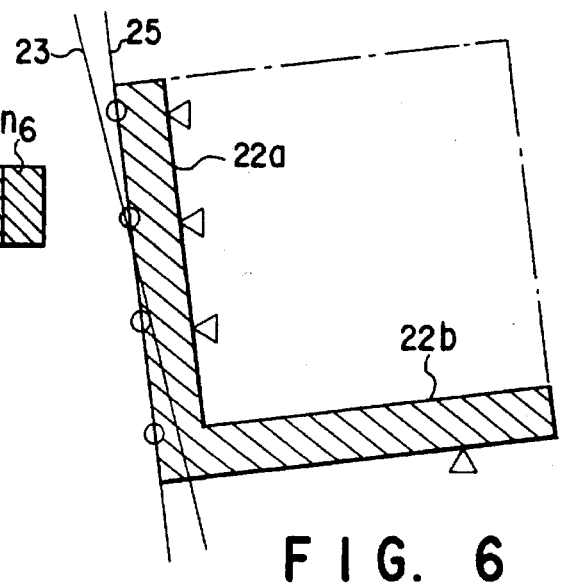
FIG. 6 is a view for explaining straight line extraction on the basis of edge points extracted by the lateral scanning in accordance with the Hough transform and the least square approximation according to the first embodiment.
Figure 7:
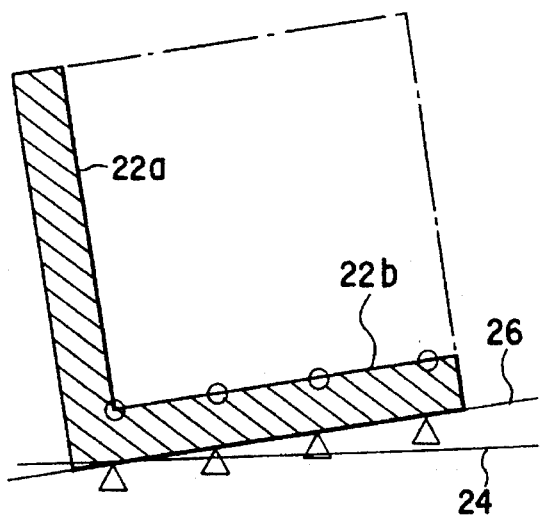
FIG. 7 is a view for explaining straight line extraction on the basis of edge points extracted by the vertical scanning in accordance with the Hough transform and the least square approximation according to the first embodiment.

FIG. 6 is a view showing a result obtained by straight line extraction in accordance with the Hough transform in FIG. 3. FIG. 7 is a view showing a result obtained by straight line extraction in accordance with the Hough transform in FIG. 4.

A Hough-transformed straight line 23 in FIG. 6 and a Hough-transformed straight line 24 in FIG. 7 are straight lines having angles and distances which are different from those of the straight lines to be actually detected because θ and R are coarsely defined.

The points which constitute these straight lines are used as sampling points to perform the least square approximation, thereby obtaining accurate straight lines 25 and 26 respectively shown in FIGS. 6 and 7.

Figure 8:
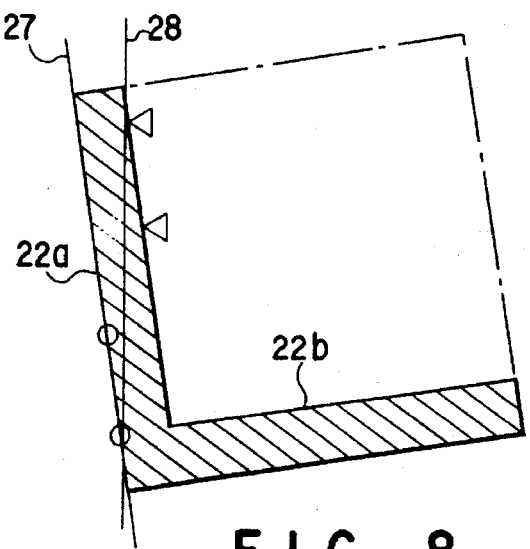
FIG. 8 is a view for explaining erroneous straight line extraction in accordance with the Hough transform.

In a coarse Hough transform, when the least square approximation is performed using, as sampling points, the edge points which define a straight line including both leading and trailing edges, a straight line 28 which is different from a straight line 27 to be actually detected is undesirably detected, as shown in FIG. 8.

Figure 10:
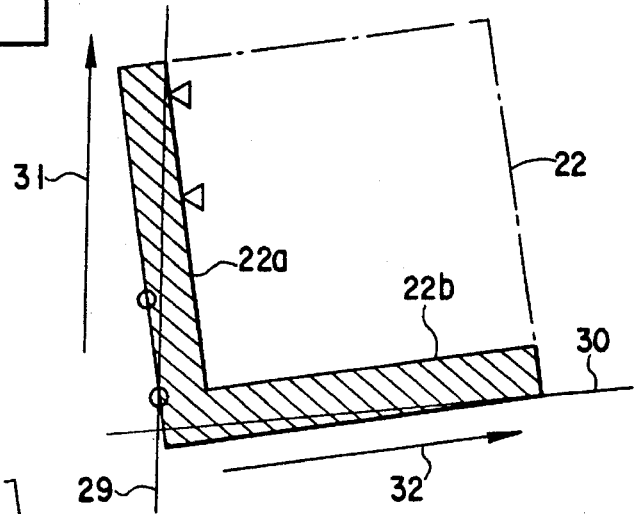
FIG. 10 is a view for explaining detection of a direction of presence of a figure according to the first embodiment.

In this embodiment, after the Hough transform using lateral scanning and vertical scanning is performed, a combination of straight lines, i.e., straight lines 29 and 30, which cross at about 90°, are selected from the detected Hough-transformed straight lines. A direction of presence of a target figure is determined by solid arrows 31 and 32 in FIG. 10 in accordance with the distribution of edge points which define the straight lines 29 and 30.

One of the directions, in which a larger number of edge points are present with respect to the intersection between the two straight lines detected by the Hough transform, is checked to determine the direction of the presence of the figure.

When the direction of the presence of the figure is determined, the leading or trailing edge of a straight line to be detected can be made clear, and the least square approximation is performed using only edge points of the corresponding attribute as sampling points. Therefore, a correct straight line can be detected.

Figure 12:
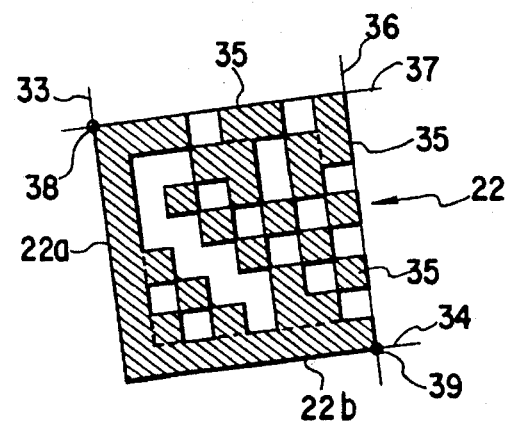
FIG. 12 is a view for explaining extraction of two remaining straight lines in the first embodiment.

Straight lines 33 and 34 corresponding to two sides 22a and 22b of the two-dimensional code figure 22 can be accurately determined, as shown in FIG. 12.

As described above, the Hough transform requires a long processing time for a large number of sampling points. In this embodiment, therefore, the angle θ and the distance R are coarsely defined, and the Hough transform is used as a means of coarsely detecting the position of a straight line. For this reason, all the edge points obtained in FIGS. 3 and 4 are not used as sampling points, and only some of the edge points are Hough-transformed as sampling points.

Figure 11:
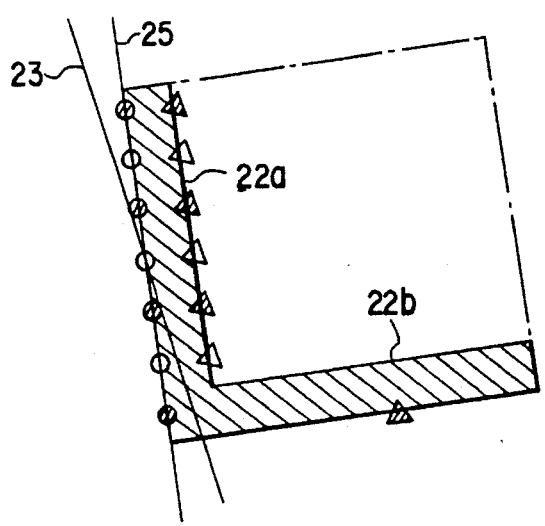
FIG. 11 is a view for explaining straight line extraction in accordance with the Hough transform according to the first embodiment.

More specifically, in FIG. 11, although o, ●, ∆, and ▲ are edge points obtained by edge detection, only the edge points of ● and ▲ are used as sampling points for the Hough transform. In this manner, a straight line almost the same as that obtained by the Hough transform using all the edge points can also be detected, thereby shortening the processing time to about half the time using all the edge points.

Upon the Hough transform, an accurate straight line is determined by performing the least square approximation. This least square approximation calculates a straight line using all the edge points including the edge points of o and ∆. With this operation, the same accurate straight line as that calculated by the Hough transform and the least square approximation using all the edge points can be detected.

A straight line detected by the Hough transform often has a feature as the straight line in the two-dimensional image area 21. The two sides of the two-dimensional code do not always have the strongest feature as the straight lines. For this reason, a plurality of straight line candidates must be detected in an order from a straight line having the strongest feature by the Hough transform. A point array representing one straight line may be detected as individual straight line candidates. In this case, even if straight lines obtained by the Hough transform are different, the straight lines become almost identical upon the least square approximation.

This indicates that an excessive time is wasted in retrieving a correct straight line candidate. In addition, for example, if the number of straight line candidates is defined as three, a correct straight line candidate cannot be detected, provided that the correct candidate has the third strongest feature as the straight line.

Figure 9:
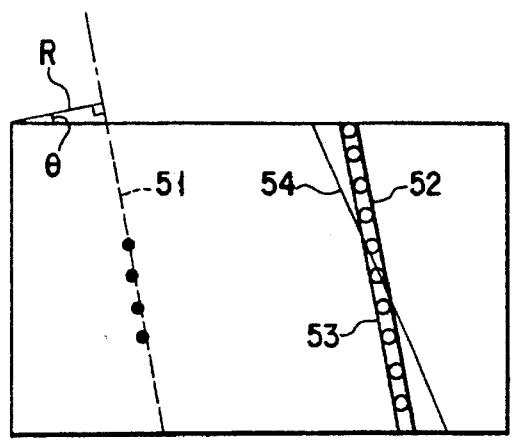
FIG. 9 is a view for explaining erroneous straight line candidate extraction.

Referring to FIG. 9, assume that the edge points of a correct straight line candidate and the edge points of a wrong straight line candidate are defined as ● and o, respectively. For example, when the number of straight line candidates is three, a straight line 51 as a dotted line is supposed to be detected, but straight lines 52, 53, and 54 indicated by solid lines may be detected as the three best candidates.

In this embodiment, to prevent a point array representing one straight line from being detected as a plurality of straight line candidates, the distances R of straight line candidates having the same angle θ or angles close to each other (e.g., about ±5°) are compared with each other to determine whether identical straight lines are detected. If straight lines having the same angle θ or angles close to each other and at the same time having distances R close to each other, these straight lines are determined to be identical and are eliminated from the straight line candidates. With this operation, even if the straight line 52 is detected as a candidate, the straight lines 53 and 54 are eliminated.

This determination is performed prior to the least square approximation, and the edge point array representing one straight line is not detected as a plurality of straight line candidates.

The length of a straight line is obtained by a known length detecting means. That is, the start and end points of a straight line are detected, and the absolute value of a difference between the start and end points is calculated to obtain the length of the straight line.

A figure to be detected is a rectangular figure, as shown in FIG. 12. Matrix elements 35 are present at positions opposing two straight lines 33 and 34. End lines 36 and 37 can be recognized as straight lines by the Hough transform.

When the matrix elements 35 at an opposing position are not continuous, imaginary end lines are drawn parallel to the two straight lines 33 and 34 obtained by the least square approximation from end points 38 and 39 at positions opposing each other. Straight lines detected by the Hough transform to have distances and angles which are close to those of the imaginary end lines are determined as the end lines 36 and 37.

At this time, detection of the end lines 36 and 37 is performed by the least square approximation upon the Hough transform in the same manner as in the first detection of the two straight lines 33 and 34, thereby performing accurate straight line extraction.

The two-dimensional code figure 22 can be extracted by extracting the four straight lines as described above.

Upon completion of the two-dimensional code FIG. 22, the sizes of the matrix elements 35 constituting this two-dimensional code are detected. In this case, the sizes of the individual matrix elements 35 are measured, and a frequently appearing value or average value may be defined as the size of the matrix elements. However, when an actual image is read to measure the sizes of the matrix elements, the size of a white matrix element may be detected to be different from that of a black matrix element due to thickening or thinning.

In this embodiment, the size of the white matrix element and the size of the black matrix element are independently detected, and an intermediate value between the independently detected values is defined as the size of the matrix elements. Therefore, the size of the matrix elements can be accurately recognized.

When the size of the extracted two-dimensional code figure 22 and the size of the matrix elements are detected, the number of lateral and vertical matrix elements in the matrix can be determined. The central position of the matrix elements is detected by uniformly dividing the area within the two opposing straight lines on the basis of the determined size of the matrix element. Matrix information is thus extracted to recognize code information.

As described above, the central position of the matrix elements is detected by uniformly dividing the area within the two opposing straight lines on the basis of the determined size of the matrix element. Therefore, code information having primary image distortion can be accurately recognized.

Figure 13:
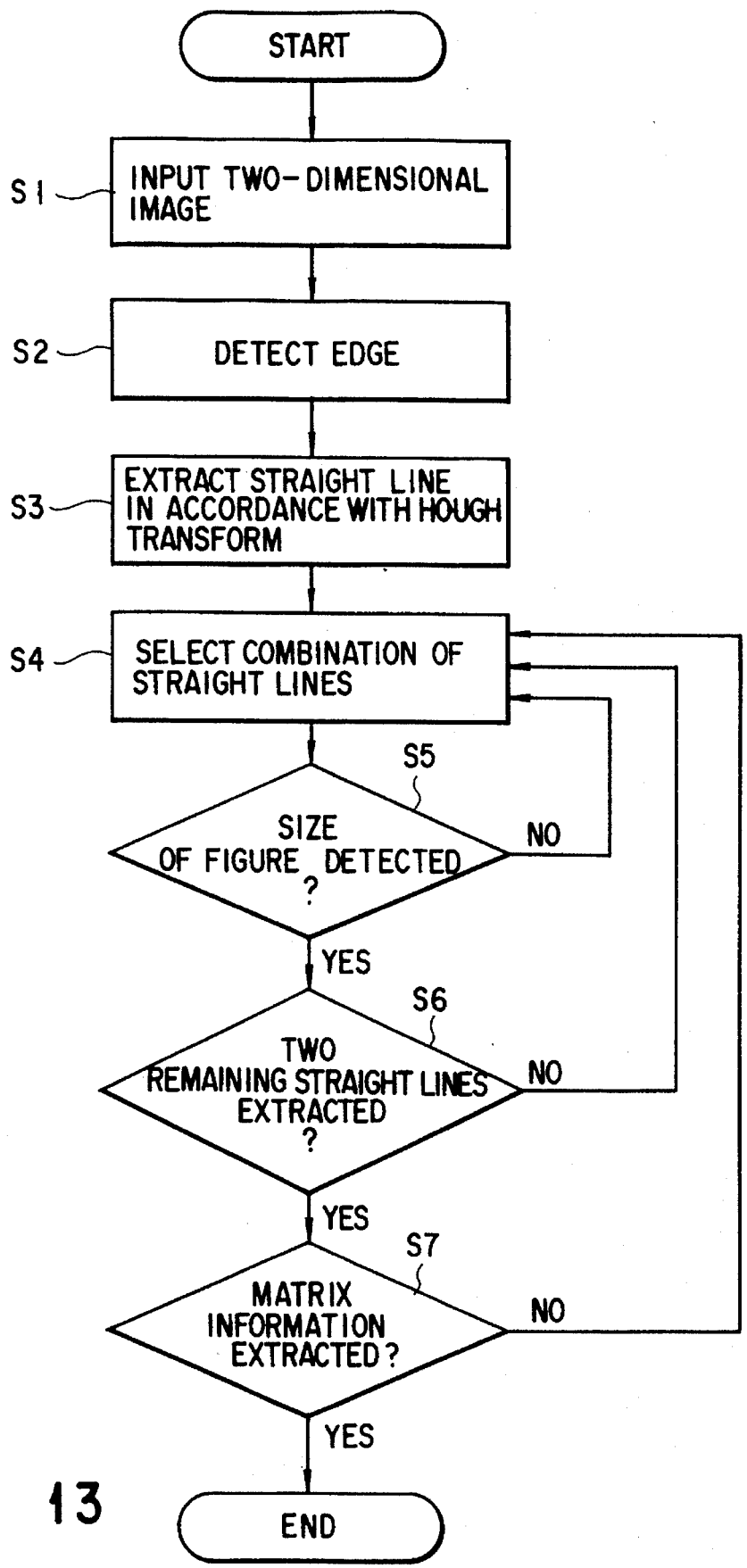
FIG. 13 is a flow chart showing figure extraction processing according to the first embodiment.
Figure 16A:
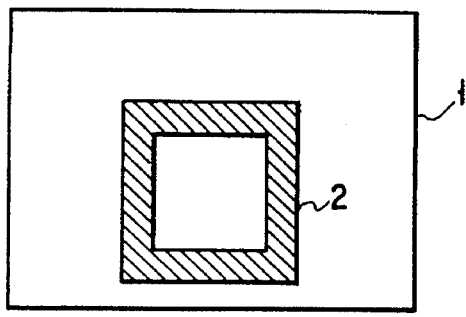
FIGS. 16A and 16B are views for explaining figure extraction in the first conventional example.
Figure 16B:
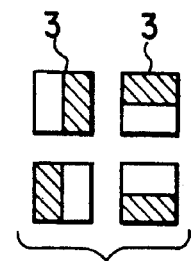
Figure 17:
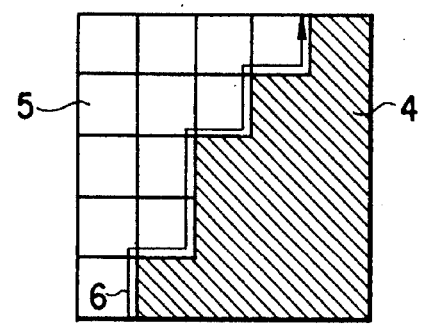
FIG. 17 is a view for explaining figure extraction in the second conventional example.
Figure 18A:
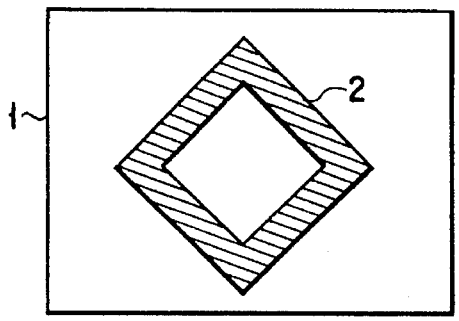
FIGS. 18A and 18B are views for explaining a problem of the first conventional example.
Figure 18B:
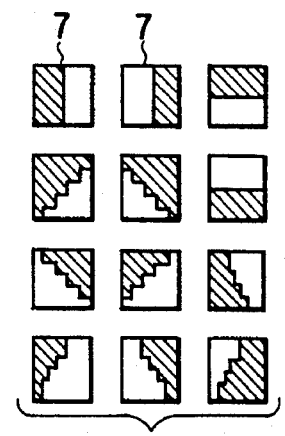
Figure 19:
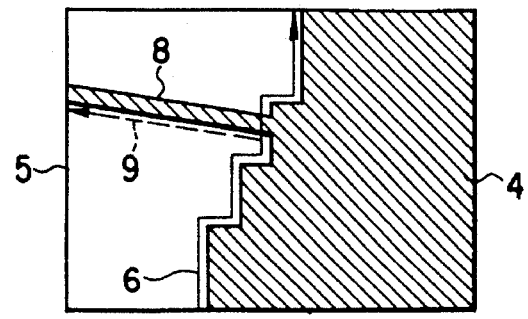
FIG. 19 is a view for explaining a problem of the second conventional example.

The above processing of the microprocessor 19 will be described with reference to a flow chart in FIG. 13. More specifically, a two-dimensional image is input in first step S1, an edge is detected in next step S2, a straight line is extracted in accordance with the Hough transform in sequential step S3, and a combination of straight lines is selected in sequential step S4. The size of a figure is detected in sequential step S5, two remaining straight lines are extracted in sequential step S6, and matrix information is extracted in last step S7. In the Hough transform in step S3, the least square approximation is also performed to perform accurate straight line extraction.

Detection of the size of a figure and extraction of two remaining straight lines are performed in steps S5 and S6, respectively. If NO in step S5 or S6, the flow returns to step S4, and selection of a combination of straight lines is performed in step S4 again.

Then, detection of the size of a figure and extraction of two remaining straight lines are performed in steps S5 and S6, respectively.

Extraction of matrix information in step S7 also includes detection of the size of matrix elements. If it is determined that the position of the detected figure is not correct in this processing, the flow returns to step S4, and selection of a combination of straight lines is performed in step S4 again.

Detection of the size of a figure and extraction of two remaining straight lines are performed in steps S5 and S6, respectively. Then, extraction of matrix information is performed in step S7.

In this manner, first, the read two-dimensional image area 21 is scanned in the lateral and vertical directions at a predetermined interval, and leading and trailing edge points of the two sides 22a and 22b of the two-dimensional code figure 22 are extracted to determine an attribute of each edge point.

After straight lines are extracted in accordance with the coarse Hough transform, a combination of the extracted straight lines which cross at about 90° is selected from the detected straight lines. A direction of presence of the figure is determined in accordance with the distribution of edge points which define the straight lines.

The leading or trailing edge of a straight line to be detected is made clear, and the least square approximation is performed using only edge points having an attribute corresponding to that of the straight line to be detected as sampling points, thereby detecting a correct straight line.

By utilizing a rectangular figure defined by the detected two straight lines, two straight lines at positions opposing each other are recognized by the Hough transform. At this time, accurate straight lines can be detected by the least square approximation upon the Hough transform.

In this manner, four sides and four corner coordinates of the target figure to be detected are determined, and the two-dimensional code figure 22 is extracted from the two-dimensional image area 21.

The size of matrix elements is detected from the extracted two-dimensional code figure, matrix information is extracted, and codes are recognized.

Upon the coarse Hough transform, a combination of straight lines which cross at about 90° is selected, a direction of presence of a figure is determined, and then accurate straight lines are detected in accordance with the least square approximation. For this reason, a two-dimensional code figure can be extracted at high speed within a short processing time. In addition, a two-dimensional code figure having a defect or the like can be accurately extracted.

It is detected whether a pixel on a scanning line is a black or white pixel every several dots such as four dots. Only when a change point is present, the change point is detected by scanning back dot by dot, thereby detecting an edge point. With this operation, a time required for the edge detection processing can be greatly shortened compared to that of a case in which all the pixels are checked to detect an edge point. Consequently, the total processing time can be further shortened to extract a two-dimensional code figure at a higher speed. Also, a pixel having a small line thickness due to a defect or the like will be discarded. From this viewpoint, accurate extraction of a two-dimensional code figure can be performed.

When image information is to be decomposed into odd and even fields, and the obtained information is to be read, one of the odd and even fields is fetched, the omitted field is interpolated by software, and the resultant data is stored in the image memory 20. With the above operation, processing for reading a two-dimensional code figure from the code holder 13 and storing the obtained data in the image memory 20 can be performed at a higher speed. Therefore, the total processing time can be further shortened, and higher-speed extraction of a two-dimensional code figure can be realized. The shutter speed of the CCD area sensor 16 can be set twice the normal speed used when both the odd and even fields are read. The resistance to blur can be improved in reading a figure, and the figure can be read clear.

When the read image information is to be scanned in the vertical and lateral directions to perform edge detection, scanning is performed first in the lateral direction in which addresses are continuous. In an access method using a 16-bit width, a given address value of 0H is regarded as 16 white pixels, and a given address value of FFFFH is regarded as 16 black pixels. Lateral scanning is performed at high speed, and the position of presence of a two-dimensional code figure is specified in this lateral scanning. Scanning in the vertical direction in which addresses are not continuous is performed only at the position of presence of the two-dimensional code figure. With this operation, edge detection can be performed at high speed, thereby further shortening the total processing time, and extracting a two-dimensional code figure at a higher speed.

When the Hough transform is to be performed to extract a straight line on the basis of the detected edge points by the edge detection, the Hough transform does not use all the edge points but every several edge points. For this reason, the processing time of extracting a straight line in accordance with the Hough transform can be shortened to an almost half, thereby further shortening the total processing time, and extracting a two-dimensional code figure at a higher speed.

In extracting a straight line in accordance with the Hough transform, a plurality of straight line candidates must be detected. The distances R (i.e., a distance between the origin and a straight line having an angle θ) of straight line candidates passing through an arbitrary sampling point and having the same angle θ or angles close to each other are compared with each other. If a difference between the distances R is small, these straight lines are determined to be identical and are eliminated from the straight line candidates. With this operation, a plurality of straight line candidates can be accurately extracted, resulting in accurate two-dimensional code figure extraction.

Further, after a two-dimensional code figure is extracted, a frequently appearing value and average value of the sizes of white matrix elements and those of black matrix elements are individually detected. An intermediate value between the individually detected values is defined as the size of matrix elements. In this manner, the size of the matrix elements can be accurately recognized.

The number of lateral and vertical matrix elements in the matrix can be determined on the basis of the size of the extracted figure and the size of the matrix element. The central position of the matrix elements is detected by uniformly dividing the area within the two opposing straight lines on the basis of the detected size of the matrix element. Matrix information is thus read. Therefore, two-dimensional codes having primary image distortion can be accurately read.

Second Embodiment

Prior to a description of the second embodiment, figure extraction will be explained. In this figure extraction, a rectangular two-dimensional code FIG. 42 having data in a matrix form whose four sides 42a, 42b, 42c and 42d are straight lines is present in a read two-dimensional image area 41, as shown in FIG. 14.

In the two-dimensional code FIG. 42, not only the two sides 42a and 42b are continuous as straight lines 43 and 44, but also the two sides 42c and 42d respectively opposing the two sides 42a and 42b are continuous as straight lines 45 and 46. That is, the two-dimensional code FIG. 42 is defined as a figure having four sides surrounded by the straight lines 43 to 46.

In the first embodiment, after two straight lines are extracted, end lines opposing the extracted two straight lines are determined on the basis of the size and end points of a figure due to the following reason. Since the opposite sides are not continuous straight lines constituted by black pixels, the obtained end lines have a weak feature as the straight line compared to that of the continuous straight line. Therefore, it is difficult to accurately detect end lines from the entire image.

In this embodiment, however, the two straight lines 43 and 44 and the two end lines 45 and 46 have a strong feature as straight lines.

For this reason, figure extraction of this embodiment is performed as shown in a flow chart of FIG. 15. That is, an edge is detected in step S2, and all the four sides of a target figure to be detected can be then detected by straight line extraction in accordance with the Hough transform in step S13.

The final extraction of an accurate straight line is performed in the same manner as in the first embodiment. Upon straight line extraction in accordance with the Hough transform, a combination of straight lines having a plurality of priorities is selected using the least square approximation in step S14. The processing in step S14 is repeated until correct matrix information is extracted in step S7. Finally, the correct matrix information is extracted in step S7.

Since the steps of detecting the size of a figure and extracting two remaining straight lines need not be used in this embodiment, the processing quality is decreased and the speed of figure extraction can be increased in comparison with the first embodiment. Also in this embodiment, as in the first embodiment, a two-dimensional code figure having a defect or the like can be accurately extracted, as a matter of course.

As in this embodiment, a two-dimensional image recognition apparatus which extracts, from a read two-dimensional image area, a rectangular two-dimensional code figure having data arranged in a form of matrix whose four sides are straight lines, and recognizes codes comprises a means for storing image information obtained by reading a two-dimensional code figure or a figure similar to the two-dimensional code figure in an image memory, an edge detecting means for detecting the edge of the figure by scanning the image information stored in the image memory in the vertical and lateral directions, a straight line position detecting means for detecting the positions of four straight lines crossing each other from the image information stored in the image memory in accordance with the Hough transform and the least square approximation, a length detecting means for detecting the lengths of the four straight lines detected by the straight line position detecting means, a matrix element detecting means for extracting a target figure to be recognized in accordance with the positions of the straight lines detected by the straight line position detecting means and the lengths of the straight lines detected by the length detecting means and detecting the size of a matrix element which constitutes a matrix in accordance with the extracted figure, and an information extracting means for extracting matrix information on the basis of the size of the extracted target figure to be recognized and the size of the matrix element, wherein the edge detecting means detects pixels on a scanning line every several dots to perform edge detection. With this arrangement, as in the above embodiment, it is detected whether a pixel on a scanning line is a black or white pixel every several dots. Only when a change point is present, the change point is detected by scanning back dot by dot, thereby detecting an edge point. For this reason, a time required for the edge detection processing can be greatly shortened compared to a case in which all the pixels are checked to detect an edge point. Therefore, the total processing time can be further shortened to extract a two-dimensional code figure at a higher speed. Also, a pixel having a small line thickness due to a defect or the like will be discarded. From this viewpoint, accurate extraction of a two-dimensional code figure can be performed.

A two-dimensional image recognition apparatus comprises a means for storing, in an image memory, image information obtained by reading a two-dimensional code figure or a figure similar to the two-dimensional code figure, an edge detecting means for detecting the edge of the figure by scanning the image information stored in the image memory in the vertical and lateral directions, a straight line position detecting means for detecting the positions of four straight lines crossing each other from the image information stored in the image memory in accordance with the Hough transform and the least square approximation, a length detecting means for detecting the lengths of the four straight lines detected by the straight line position detecting means, a matrix element detecting means for extracting a target figure to be recognized in accordance with the positions of the straight lines detected by the straight line position detecting means and the lengths of the straight lines detected by the length detecting means and detecting the size of a matrix element which constitutes a matrix in accordance with the extracted figure, and an information extracting means for extracting matrix information on the basis of the size of the extracted target figure to be recognized and the size of the matrix element, wherein when the read image information is decomposed into odd and even fields, the means of storing the image information in the image memory reads one of the odd and even fields, interpolates the read fields, and stored the resultant data in the image memory. With this arrangement, as in the above embodiment, when the image information is decomposed into the odd and even fields, and the obtained information is read, one of the odd and even fields is fetched, the omitted field is interpolated by software, and the resultant data is stored in the image memory. With the above operation, processing for reading a two-dimensional code figure and storing the obtained data in the image memory can be performed at a higher speed. For this reason, the total processing time can be further shortened, and higher extraction of a two-dimensional code figure can be realized. The shutter speed of the CCD area sensor can be set twice the normal speed used when both the odd and even fields are read. The resistance to blur can be improved in reading a figure, and the figure can be read clear.

A two-dimensional image recognition apparatus comprises a means for storing, in an image memory, image information obtained by reading a two-dimensional code figure or a figure similar to the two-dimensional code figure, an edge detecting means for detecting the edge of the figure by scanning the image information stored in the image memory in the vertical and lateral directions, a straight line position detecting means for detecting the positions of four straight lines crossing each other from the image information stored in the image memory in accordance with the Hough transform and the least square approximation, a length detecting means for detecting the lengths of the four straight lines detected by the straight line position detecting means, a matrix element detecting means for extracting a target figure to be recognized in accordance with the positions of the straight lines detected by the straight line position detecting means and the lengths of the straight lines detected by the length detecting means and detecting the size of a matrix element which constitutes a matrix in accordance with the extracted figure, and an information extracting means for extracting matrix information on the basis of the size of the extracted target figure to be recognized and the size of the matrix element, wherein the edge detecting means performs edge detection first in a direction in which scanning is performed by accessing continuous addresses, and specifies the position of presence of the target figure to be recognized, and then, the edge detecting means performs edge detection on the specified position of presence of the figure in the remaining direction. With this arrangement, as in the above embodiment, scanning is performed first in the lateral direction in which addresses are continuous. In an access method using a 16-bit width, a given address value of 0H is regarded as 16 white pixels, and a given address value of FFFFH is regarded as 16 black pixels. Lateral scanning is performed at high speed, and the position of presence of a two-dimensional code figure is specified in this lateral scanning. Scanning in the vertical direction in which the addresses are not continuous is performed only on the position of presence of the two-dimensional code figure. Therefore, edge detection can be performed at high speed, thereby further shortening the total processing time, and extracting a two-dimensional code figure at a higher speed.

A two-dimensional image recognition apparatus comprises a means for storing, in an image memory, image information obtained by reading a two-dimensional code figure or a figure similar to the two-dimensional code figure, an edge detecting means for detecting the edge of the figure by scanning the image information stored in the image memory in the vertical and lateral directions, a straight line position detecting means for detecting the positions of four straight lines crossing each other from the image information stored in the image memory in accordance with the Hough transform and the least square approximation, a length detecting means for detecting the lengths of the four straight lines detected by the straight line position detecting means, a matrix element detecting means for extracting a target figure to be recognized in accordance with the positions of the straight lines detected by the straight line position detecting means and the lengths of the straight lines detected by the length detecting means and detecting the size of a matrix element which constitutes a matrix in accordance with the extracted figure, and an information extracting means for extracting matrix information on the basis of the size of the extracted target figure to be recognized and the size of the matrix element, wherein assuming that a distance between the origin and a straight line passing through an arbitrary sampling point and having an angle θ is defined as R, the straight line position detecting means compares the distances R of straight line candidates having the same angle θ or angles close to each other, and when these straight lines are determined to be identical, these straight lines are eliminated from the straight line candidates. With this arrangement, as in the above embodiment, since the straight line candidates which are determined to be identical can be eliminated, a plurality of straight line candidates can be accurately detected, resulting in accurate two-dimensional code figure extraction.

A two-dimensional image recognition apparatus comprises a means for storing, in an image memory, image information obtained by reading a two-dimensional code figure or a figure similar to the two-dimensional code figure, an edge detecting means for detecting the edge of the figure by scanning the image information stored in the image memory in the vertical and lateral directions, a straight line position detecting means for detecting the positions of four straight lines crossing each other from the image information stored in the image memory in accordance with the Hough transform and the least square approximation, a length detecting means for detecting the lengths of the four straight lines detected by the straight line position detecting means, a matrix element detecting means for extracting a target figure to be recognized in accordance with the positions of the straight lines detected by the straight line position detecting means and the lengths of the straight lines detected by the length detecting means and detecting the size of a matrix element which constitutes a matrix in accordance with the extracted figure, and an information extracting means for extracting matrix information on the basis of the size of the extracted target figure to be recognized and the size of the matrix element, wherein the matrix element detecting means individually detects the size of white matrix elements and that of black matrix elements, and defines an intermediate value between the individually detected values as the size of matrix elements. With this arrangement, as in the above embodiment, the size of the matrix elements can be accurately recognized.

Note that the above embodiments have exemplified extraction of a rectangular two-dimensional code figure having data arranged in a matrix form whose two or four sides are straight lines. The present invention, however, is not limited to this. For example, the present invention can also be applied to extraction and recognition of a figure whose two or four sides are straight lines similar to a two-dimensional code figure, e.g., to a case in which an IC element mounted on a printed board is read as a two-dimensional figure.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A two-dimensional code recognition apparatus comprising:

an image reading section for optically reading an image including a rectangular two-dimensional code figure and for converting the read image into image information of a dot matrix form corresponding to coordinates of reading points;

an image memory section for storing the image information produced by said image reading section;

an image processing section for extracting a part of the image information stored in said image memory section which corresponds to the two-dimensional code figure, and for detecting two-dimensional code data from the extracted part of the image information;

wherein said image processing section includes: (i) edge point detecting means for detecting edge points forming an outline of the two-dimensional code figure by scanning rows and columns of the image information which are respectively separated by a predetermined number in column and row directions, (ii) straight line approximating means for performing an approximating operation of obtaining straight lines corresponding to the detected edge points by Hough transform and for determining two perpendicularly intersecting straight lines within a result of the Hough transform by a least square approximation, and (iii) specifying means for specifying the part of the image information corresponding to the two-dimensional code figure based on positions of the determined two perpendicularly intersecting straight lines.

2. An apparatus according to claim 1, wherein said edge point detecting means includes checking means for sampling and checking pixels separated by a predetermined number in each of the rows and columns of the image information to be scanned.

3. An apparatus according to claim 1, wherein said image memory section includes means, responsive to the image information being decomposed into odd and even fields, for reading one of the odd and even fields and obtaining the other of the odd and even field from the read field by interpolation.

4. An apparatus according to claim 1, wherein said edge point detecting means includes means for fully scanning rows and columns of the image information to which continuous addresses are assigned in said image memory section, and means for scanning within a restricted range rows and columns of the image information to which continuous addresses are not assigned, said restricted range being restricted based on a position of the two-dimensional code figure schematically obtained as a result of fully scanning said rows and columns to which continuous addresses are assigned.

5. An apparatus according to claim 1, wherein said straight line approximating means includes means, responsive to said straight line approximating means obtaining a plurality of straight line candidates each passing at least two of the detected edge points by Hough transform, for regarding straight line candidates which are set at a substantially same angle e and a substantially same distance R from an origin as being identical to each other and means for eliminating redundant identical straight line candidates.

6. An apparatus according to claim 1, wherein said specifying means includes means for obtaining positions of two perpendicularly intersecting straight lines remaining as an outline of the rectangular two-dimensional code figure based on lengths of the two straight lines determined by the straight line approximating means.

7. An apparatus according to claim 6, wherein said image processing section further includes converting means for converting the extracted part of the image information into two-dimensional code data based on sizes of the two-dimensional code figure and data elements arranged in a matrix form within a code data area of the two-dimensional code figure.

8. An apparatus according to claim 7, wherein said converting means includes means, responsive to said specifying means obtaining dashed straight lines formed of white and black cells arranged in series as the remaining two straight lines of the rectangular two-dimensional code figure, for detecting a size of a data element from a size of the white and black cells.

9. A two-dimensional code recognition apparatus comprising:

an image reading section for optically reading an image including a rectangular two-dimensional code figure and for converting the read image into image information of a dot matrix form corresponding to coordinates of reading points;

an image memory section for storing the image information produced by said image reading section;

an image processing section for extracting a part of the image information stored in said image memory section, which corresponds to the two-dimensional code figure, and for detecting two-dimensional code data from the extracted part of the image information;

wherein said image processing section includes: (i) edge point detecting means for detecting edge points forming an outline of the two-dimensional code figure by scanning rows and columns of the image information which are respectively separated by a predetermined number in column and row directions, (ii) straight line approximating means for performing an approximating operation of obtaining straight lines corresponding to the detected edge points by Hough transform and for determining four perpendicularly intersecting straight lines within a result of Hough transform by a least square approximation, and (iii) specifying means for specifying the part of the image information corresponding to the two-dimensional code figure based on positions of the four perpendicularly intersecting straight lines.

10. An apparatus according to claim 9, wherein said edge point detecting means includes checking means for sampling and checking pixels separated by a predetermined number in each of the rows and columns of the image information to be scanned.

11. An apparatus according to claim 9, wherein said image memory section includes means, responsive to the image information being decomposed into odd and even fields, for reading one of the odd and even fields and obtaining the other of the odd and even field from the read field by interpolation.

12. An apparatus according to claim 9, wherein said edge point detecting means includes means for fully scanning rows and columns of the image information to which continuous addresses are assigned in said image memory section, and means for scanning within a restricted range rows and columns of the image information to which continuous addresses are not assigned, said restricted range being restricted based on a position of the two-dimensional code figure schematically obtained as a result of fully scanning said rows and columns to which continuous addresses are assigned.

13. An apparatus according to claim 9, wherein said straight line approximating means includes means, responsive to said straight line approximating means obtaining a plurality of straight line candidates each passing at least two of the detected edge points by Hough transform, for regarding straight line candidates which are set at a substantially same angle e and a substantially same distance R from an origin as being identical to each other and means for eliminating redundant identical straight line candidates.

14. An apparatus according to claim 9, wherein said image processing section further includes converting means for converting the extracted part of the image information into two-dimensional code data based on sizes of the two-dimensional code figure and data elements arranged in a matrix form within a code data area of the two-dimensional code figure.

15. A two-dimensional code recognition method comprising steps of:

optically reading an image including a rectangular two-dimensional code figure and converting the read image into image information of a dot matrix form corresponding to coordinates of reading points;

storing the image information in an image memory section;

performing an image processing operation of extracting a part of the image information stored in said image memory section which corresponds to the two-dimensional code figure, and detecting two-dimensional code data from the extracted part of the image information;

wherein said image processing step includes the substeps of (i) detecting edge points forming an outline of the two-dimensional code figure by scanning rows and columns of the image information which are respectively separated by a predetermined number in column and row directions, (ii) performing an approximating operation of obtaining straight lines corresponding to the detected edge points by Hough transform and determining two perpendicularly intersecting straight lines within a result of Hough transform by a least square approximation, and (iii) specifying the part of the image information corresponding to the two-dimensional code figure based on positions of the two perpendicularly intersecting straight lines.

16. A method according to claim 15, wherein said edge point detecting step includes a substep of sampling and checking pixels separated by a predetermined number in each of the rows and columns of the image information to be scanned.

17. A method according to claim 15, wherein when the image information is decomposed into odd and even fields said storing step includes a substep of reading one of the odd and even fields and obtaining the other of the odd and even field from the read field by interpolation.

18. A method according to claim 15, wherein said edge point detecting substep includes a substep of fully scanning ones of the rows and columns of the image information to which continuous addresses are assigned in said image memory section, and a further substep of scanning within a restricted range rows and columns of the image information to which continuous addresses are not assigned, said restricted range being based on a position of the two-dimensional code figure schematically obtained as a result of fully scanning said rows and columns to which continuous addresses are assigned.

19. A method according to claim 15, wherein when said straight line approximating substep obtains a plurality of straight line candidates each passing at least two of the detected edge points by Hough transform, said straight line approximating substep includes a substep of regarding straight line candidates which are set at a substantially same angle e and a substantially same distance R from an origin as being identical to each other, and a further substep of eliminating redundant identical straight line candidates.

20. A method according to claim 15, wherein said specifying substep includes a substep of obtaining positions of two perpendicularly intersecting straight lines remaining as an outline of the rectangular two-dimensional code figure based on lengths of the two straight lines determined in the straight line approximating substep.

21. A method according to claim 20, wherein said image processing step further includes a substep of converting the extracted part of the image information into two-dimensional code data based on sizes of the two-dimensional code figure and data elements arranged in a matrix form within a code data area of the two-dimensional code figure.

22. A method according to claim 21, wherein when said specifying substep obtains dashed straight lines formed of white and black cells arranged in series as the remaining two straight lines of the rectangular two-dimensional code figure, said converting substep includes a substep of detecting a size of a data element from a size of the white and black cells.

23. A two-dimensional code recognition method comprising steps of:

optically reading an image including a rectangular two-dimensional code figure and converting the read image into image information of a dot matrix form corresponding to coordinates of reading points;

storing the image information in an image memory section;

performing an image processing operation of extracting a part of the image information stored in said image memory section which corresponds to the two-dimensional code figure, and detecting two-dimensional code data from the extracted part of the image information;

wherein said image processing step includes the substeps of (i) detecting edge points forming an outline of the two-dimensional code figure by scanning rows and columns of the image information which are respectively separated by a predetermined number in column and row directions, (ii) performing an approximating operation of obtaining straight lines corresponding to the detected edge points by Hough transform and determining four perpendicularly intersecting straight lines within a result of Hough transform by a least square approximation, and (iii) specifying the part of the image information corresponding to the two-dimensional code figure based on positions of the four perpendicularly intersecting straight lines.

24. A method according to claim 23, wherein said edge point detecting step includes a substep of sampling and checking pixels separated by a predetermined number in each of the rows and columns of the image information to be scanned.

25. A method according to claim 23, wherein when the image information is decomposed into odd and even fields said storing step includes a substep of reading one of the odd and even fields and obtaining the other of the odd and even field from the read field by interpolation.

26. A method according to claim 23, wherein said edge point detecting substep includes a substep of fully scanning ones of the rows and columns of the image information to which continuous addresses are assigned in said image memory section, and a further substep of scanning within a restricted range rows and columns of the image information to which continuous addresses are not assigned, said restricted range being based on a position of the two-dimensional code figure schematically obtained as a result of fully scanning said rows and columns to which continuous addresses are assigned.

27. A method according to claim 23, wherein when said straight line approximating substep obtains a plurality of straight line candidates each passing at least two of the detected edge points by Hough transform, said straight line approximating substep includes a substep of regarding straight line candidates which are set at a substantially same angle e and a substantially same distance R from an origin as being identical to each other, and a further substep of eliminating redundant identical straight line candidates.

28. A method according to claim 23, wherein said image processing step further includes a substep of converting the extracted part of the image information into two-dimensional code data based on sizes of the two-dimensional code figure and data elements arranged in a matrix form within a code data area of the two-dimensional code figure.

* * * * *